United States Patent [19]

Zahid

[11] 4,134,429

[45] Jan. 16, 1979

[54] HYDRAULIC ACCUMULATOR HAVING AN IMPROVED OIL PORT SEAL

[75] Inventor: Abduz Zahid, Los Angeles, Calif.

[73] Assignee: Greer Hydraulics, Inc., Los Angeles, Calif.

[21] Appl. No.: 806,835

[22] Filed: Jun. 15, 1977

[51] Int. Cl.[2] .......... F16L 55/04

[52] U.S. Cl. .......... 138/30; 220/85 B; 277/205

[58] Field of Search .......... 138/30, 26; 277/205; 220/85 B

[56] References Cited

U.S. PATENT DOCUMENTS

| | | | |
|---|---|---|---|
| 1,861,916 | 6/1932 | Henneböhle | 277/205 X |
| 3,433,268 | 3/1969 | Greer | 138/30 |
| 3,439,712 | 4/1969 | Mercier | 138/30 |
| 3,593,746 | 7/1971 | Allewitz et al. | 138/30 |
| 3,744,527 | 7/1973 | Mercier | 138/30 |
| 3,868,972 | 3/1975 | Zipps | 138/30 |

FOREIGN PATENT DOCUMENTS

| | | | |
|---|---|---|---|
| 40899 | 10/1887 | Fed. Rep. of Germany | 277/205 |

OTHER PUBLICATIONS

Houghton, E. F. & Co., *A Handbook on Hydraulic & Pneumatic Leather Packings*, Houghton Press, 1948, p. 108.

*Primary Examiner*—Richard E. Aegerter
*Assistant Examiner*—James E. Bryant, III
*Attorney, Agent, or Firm*—Arthur B. Colvin

[57] ABSTRACT

The present invention relates to a hydraulic accumulator-pulse dampener of the bladder type and is characterized by the provision of an improved seal assembly interposed between the oil port of the pressure vessel and the oil conduit connector fixture, said seal arrangement providing an annular, effective, and readily assembled seal between the fixture and the pressure vessel.

1 Claim, 3 Drawing Figures

HYDRAULIC ACCUMULATOR HAVING AN IMPROVED OIL PORT SEAL

BACKGROUND OF THE INVENTION

1. Field of the Invention

The present invention is in the field of hydraulic accumulators and more particularly pertains to a unit having an improved seal arrangement between the pressure vessel and the oil input fixture.

2. The Prior Art

As conducive to an understanding of the present invention, reference is made, by way of example, to U.S. Pat. No. 3,733,262 wherein there is disclosed a hydraulic accumulator which includes an oil port within which is mounted an oil conduit fixture. In the construction of the subject patent, means is provided for locking the fixture in the oil port in such manner that the fixture cannot be inadvertently removed while pressure remains in the interior of the vessel.

Such construction is advantageous in that, in the absence of such a system, the plug or oil conduit fixture may be violently expelled from the pressure vessel by the retained pressure, with consequent injury to a worker.

In accordance with the device of the subject patent, the outlet plug, consisting of a component of the oil fixture, incorporates a cylindrical shank portion having a radially extended flange at its upper end, the outer diameter of the flange being less than the inside diameter of the bore of the oil port to permit its insertion therethrough. The plug is maintained in position by a locking assembly comprising a pair of arcuate metallic segments united by an annular elastomeric member.

The assembly of the device is effected by folding the locking member at the break line defined between the segments and inserting the same into the interior of the pressure vessel and passing the plug into the vessel and through the locking assembly so that the flange portion of the plug rests on the segments. An O-ring is then introduced into the annular space defined between the plug on the inside and the oil port on the outside. Thereafter, a collar member having a sleeve is positioned over the plug such that the O-ring is interposed between the sleeve of the collar and the lower end portion of the annular segments. A locking nut mounted on the shank of the plug is threaded upwardly to compress the O-ring between the sleeve and the locking segments, whereby an effective seal is formed at an annular area by the compressed and, hence, radially distended O-ring.

As will be readily recognized from the above description or from an inspection of the above referenced patent, the construction of the patent requires the disposition of an O-ring which, for purposes of forming an effective seal, must preferably be slightly oversize, into a small annular space between the oil port and the oil conduit plug.

In view of the extreme pressure involved, even minor scratches or abrasions of the O-ring effected upon insertion of the same may result in substantial oil leakage across the abraded portion of the ring and outwardly through the oil port. The sensitivity of the ring to damage, coupled with the desirably oversize nature of the O-ring, render the positioning of the ring a tedious and timeconsuming process which must be effected with a great deal of care if leakage is to be avoided.

SUMMARY OF THE INVENTION

The present invention may be summarized as directed to an improvement in hydraulic pressure accumulators, and more particularly to the provision of an improved hydraulic accumulator assembly of the type in which an oil conduit plug is disposed in sealed relation within the oil port of the accumulator.

The device is characterized by the provision of an improved seal assembly forming an annular barrier surrounding the plug, the seal assembly including a seal member having upwardly directed inner and outer annular lips in combination with a sleeve having a depending wedge-shaped annular fixture adapted, in the assembled condition, to enter into the space between the inner and outer annular lips and deflect the same respectively inwardly against the plug and outwardly against the oil port as the plug is clamped into position. By virtue of the elastomeric seal member including spaced lip members, it is a simple task during mounting to deflect the outer member inwardly and the inner member outwardly whereby the seal may be positioned for final clamping without running the risk of abrading or cutting the seal.

Accordingly, it is an object of the present invention to provide a hydraulic accumulator of the type in which a cylindrical plug is mounted within a surrounding cylindrical bore defining an oil port, said accumulator including an improved seal assembly which may be readily positioned and which is highly effective to prevent leakage through the annular space defined between the bore and the plug.

To attain these objects and such further objects as may appear herein or be hereinafter pointed out, reference is made to the accompanying drawings, forming a part hereof, in which.

Figure 1:
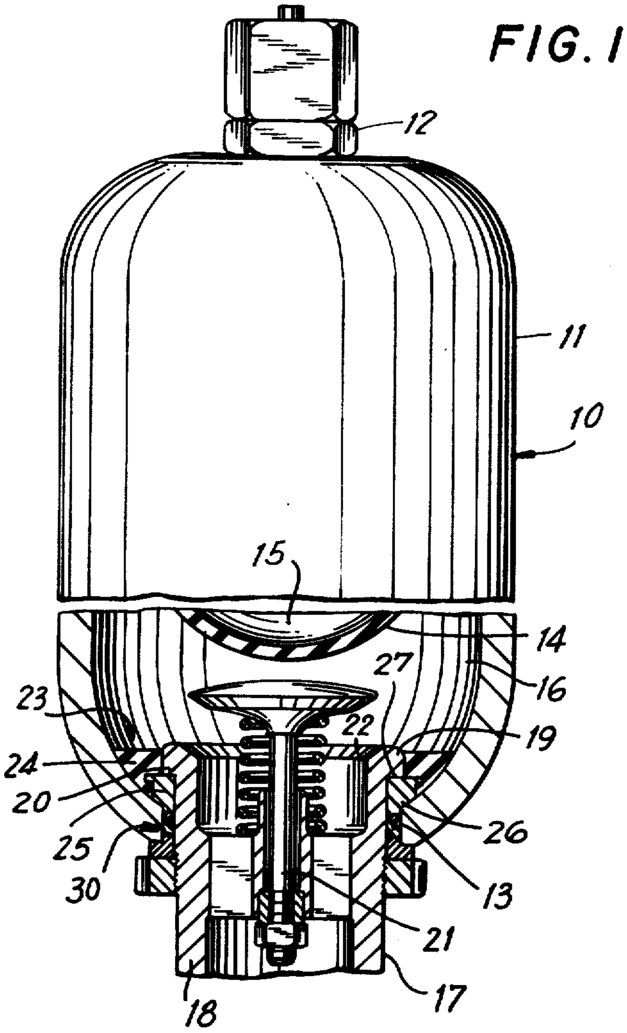
FIG. 1 is a side elevational view of a hydraulic accumulator, partially in section, showing the novel seal arrangement in accordance with the invention.

In accordance with the invention, there is shown a functionally conventional hydraulic accumulator 10, said accumulator including a pressure vessel 11 having a gas charging port 12 at one end and an oil port 13 at the other. A bladder 14 is interposed between the ports 12, 13 and divides the vessel 11 into an upper chamber 15 and a lower chamber 16. As is conventional in devices of the type described, the upper chamber is filled with gas under pressure whereas the oil port 13 is connected to a source of oil or like hydraulic fluid which is subjected to varying pressures.

When the pressure in the chamber 16 exceeds the pressure in chamber 15, the oil enters the chamber 16 and gas in the chamber 15 is compressed to store energy, whereby the device may be used in a well known manner as a pulse dampener or as an accumulator.

The principal contribution of the present invention is directed to the manner in which the plug or connector fixture 17, required for effecting communication between the oil conduit (not shown) and the chamber 16, is mounted within the oil port 13.

The plug 17 comprises a generally cylindrical shank portion 18 having a radially outwardly projecting flange 19 which includes a depending mounting shoulder 20. The plug 17 may include a poppet valve assembly 21 of essentially conventional design, which coacts with bladder 14 to be shifted between sealing and unsealing relation of a valve seat 22 formed on the plug.

The plug 17 is mounted in the oil port 13 by first positioning within the chamber 16 of the pressure vessel, locking member 23 formed generally in accordance with the above referenced patent, such locking assembly including a continuous annular elastomeric surround 24 bonded to a pair of arcuate metallic segments 25, 26, each of which segments extends for an arc of about 180°.

The locking assembly 23 may be positioned by folding the same in half about the junction line between the segments 25, 26, inserting the thus folded unit through the oil port 13, and thereafter permitting the same to snap or spread under the influence of the elastomeric surround to its normal annular configuration.

The plug 17 may thereafter be positioned by inserting the same upwardly through the oil port 13, spreading the segments 25, 26 against the elastic force of the surround 24, and thereafter permitting the segments to snap together, after which the depending shoulder 20 will overlie upwardly directed annular portion 27 of the segments 25, 26.

Figure 2:
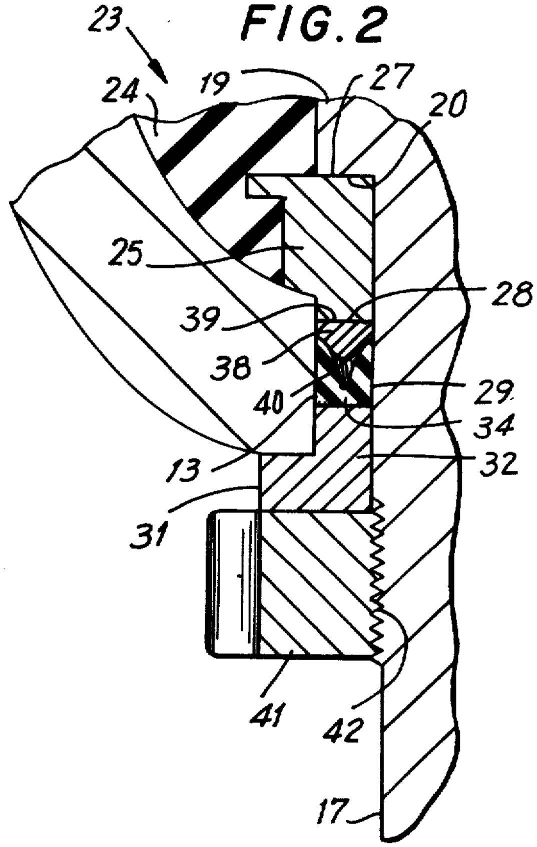
FIG. 2 is a magnified sectional view of the circled area depicted in FIG. 1.

As best seen in FIG. 2, the segments 25, 26 include a depending cylinder portion or skirt 28 which extends into the space defined between the bore of the oil port 13 and the outwardly directed perimetal portion 29 of the cylindrical shank 18 of the plug 17.

The seal is effected by the provision of an annular spacer collar 30, which collar includes a radially extending flange 31 and an upwardly extending sleeve portion 32. To the upper end 33 of the sleeve portion 32 there is bonded or molded an elastomeric, oil resistant seal member 34.

Figure 3:
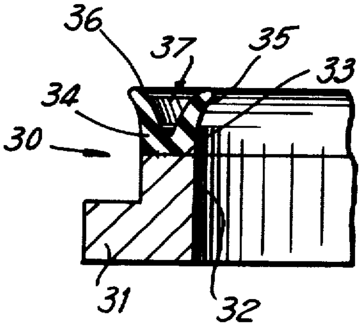
FIG. 3 is a magnified view of the elastomeric seal member prior to assembly.

The annular seal member 34 includes upwardly extending inner and outer annular lip members 35, 36, respectively, the lip members defining therebetween a space 37 which is generally V-shaped in vertical section. As best seen in FIG. 3, the lips 35, 36, in the unstressed position, diverge and extend inwardly and outwardly beyond the vertical extremities of the sleeve 32.

The seal member 34 operates in conjunction with an annular spreader washer 38, which washer includes an upwardly facing shoulder 39 in contact with depending shoulder 28 of the segments 25, 26. The washer 38 includes a downwardly directed annular wedge surface 40.

The apparatus is assembled, after the plug is mounted in the manner hereinabove set forth, by sleeving the washer 38 upwardly into the annular space between the oil port 13 and the perimetal portion 29 of the shank 18 of the plug. Thereafter the seal assembly 30 is inserted into the noted space, preferably by manually deflecting the lip edges of the annular lips 35, 36 inwardly until they freely enter the space, and thereafter forcing the assembly 30 upwardly.

Upon such upward movement, the sleeve portion 32 will enter into the space between the oil port and the shank of the plug and the depending wedge portion 40 of the washer 38 will enter into the space 37 between the annular lips 35, 36.

A clamp nut 41 is thereafter mounted upon threaded portion 42 on the shank of the plug. Upon tightening of the clamp nut, it will be observed that the segments 25, 26 will be pulled downwardly into engagement with portions of the pressure vessel surrounding the oil port 13. Concomitantly, the flange 31 will be upwardly pressed into engagement with external portions of the pressure vessel 11 surrounding the oil port 13.

The clamping movements above referred to will operate more deeply to seat the wedge-shaped washer 38 in the space 37 between the lips of the seal member, whereby there is developed a radial pressure, and an effective seal between the plug and the oil port.

As hereinabove noted, the elastomeric seal member 34 may be formed as part of the seal assembly 30, i.e. integrated with the collar, or may be a separate member inserted into the noted annular space.

Insertion of the elastomeric seal member may be effected without danger of abrasion due to the ready compressibility in a radial direction of the spaced inner and outer lip members. Moreover, the possibility of a leak, even if a minor abrasion should occur in the course of insertion, is greatly reduced by virtue of the radial forces generated on the lips by the spreader washer.

It will be further recognized that if any fluids were to pass beyond the spreader washer and enter into the space between the lips 35, 36, the pressure exerted by such fluid would tend to augment the seal by spreading the lips.

Numerous variations may be made in the light of the disclosure without departing from the spirit of the invention. Thus, while the elastomeric member 34 has been described as bonded to the collar 30, separate components may be suitably employed.

Similarly, while the spreader washer has been described as an independent element, the function thereof may be served by an appropriately configured dependent portion on the segments of the locking assembly.

Accordingly, the invention is to be broadly construed within the scope of the appended claims.

Having thus described the invention and illustrated its use, what is claimed as new and is desired to be secured by Letters Patent is:

1. In a pressure accumulator device of the type which comprises a metallic pressure vessel having a gas charging port at one end and an oil port defined by a bore at the other end, said accumulator including an outlet plug having a cylindrical shank extending through and spaced from said bore and having a radially outwardly extending flange disposed within said vessel, portions of said shank externally of said vessel being threaded, an annular metallic locking member within said vessel and encompassing said shank, said locking member having internal diameter portions closely embracing the exterior of said shank and external retainer portions engaging the upwardly facing walls of said vessel surrounding said bore, and an end portion disposed in the space between said bore and said shank, said flange of said plug extending radially in overlapping relation of said locking member, the improvement which comprises an annular metallic spacer collar mounted on said shank of said plug, said collar including an annular flange extending radially from a lower portion of said collar and engaging external surfaces of said vessel surrounding said port, a sleeve portion extending upwardly from said flange and disposed in said space between said bore and said shank, an annular, resilient elastomeric seal member (mounted on) fixed to said sleeve and extending upwardly therefrom into said space, said seal member including outer and inner annular, radially spaced-apart concentric lip portions, said lip portions extending upwardly into said space and being disposed adjacent the inner diameter of said bore and the outer diameter of said shank, respectively, an annular metallic spreader washer interposed between said end portion of said locking member and said seal member, said washer including an annular wedge surface disposed between said lips, clamp nut means threadedly mounted on said shank urging said locking member and said flange of said spacer collar into sealing engagement with portions of said vessel adjacent the interior and exterior of said bore, respectively, and urging said spreader washer toward said seal member to deflect said outer and inner lip portions, respectively, radially outwardly and inwardly to define an annular seal area between said bore and said shank, the distance between said retainer portions of said locking member and said annular flange of said collar being a fixed distance as a result of the metal-to-metal contact between said retainer portions, walls of said vessel, and said flange of said collar, whereby the distance of penetration of said spreader washer between the lips of said seal member is fixed, thereby accurately to control the lateral sealing forces exerted by said lip portions.

* * * * *